(12) United States Patent
Burkhardt et al.

(10) Patent No.: US 10,444,051 B2
(45) Date of Patent: Oct. 15, 2019

(54) ULTRASONIC SENSOR ASSEMBLY AND METHOD OF MANUFACTURE

(71) Applicant: Georg Fischer Signet, LLC, El Monte, CA (US)

(72) Inventors: Gert Burkhardt, Pasadena, CA (US); Jorge Samayoa, Los Angeles, CA (US)

(73) Assignee: Georg Fischer Signet, LLC, El Monte, CA (US)

( * ) Notice: Subject to any disclaimer, the term of this patent is extended or adjusted under 35 U.S.C. 154(b) by 66 days.

(21) Appl. No.: 15/401,454

(22) Filed: Jan. 9, 2017

(65) Prior Publication Data

US 2018/0196007 A1      Jul. 12, 2018

(51) Int. Cl.
| | | |
|---|---|---|
| *G01F 1/66* | (2006.01) | |
| *G01F 15/00* | (2006.01) | |
| *F15D 1/02* | (2006.01) | |
| *G01F 15/18* | (2006.01) | |

(52) U.S. Cl.
CPC .............. *G01F 15/00* (2013.01); *G01F 1/662* (2013.01); *F15D 1/02* (2013.01); *G01F 1/667* (2013.01); *G01F 15/185* (2013.01)

(58) Field of Classification Search
CPC .............................. G01N 29/22; G01F 1/3236
See application file for complete search history.

(56) References Cited

U.S. PATENT DOCUMENTS

| | | |
|---|---|---|
| 2,582,249 A | 1/1952 | Hendel |
| 3,332,446 A | 7/1967 | Mann |
| 3,490,496 A | 1/1970 | Stearns |
| 4,130,904 A | 12/1978 | Whalen |
| 4,236,509 A | 12/1980 | Takahashi et al. |
| 4,415,185 A | 11/1983 | Vinciguerra et al. |
| 4,545,244 A | 11/1985 | Yasuda et al. |
| 4,765,602 A | 8/1988 | Roeseler |
| 4,966,202 A | 10/1990 | Bryan et al. |
| 5,482,089 A | 1/1996 | Weber et al. |
| 5,678,809 A | 10/1997 | Nakagawa et al. |
| 5,905,207 A | 5/1999 | Schalk |
| 6,176,138 B1 | 1/2001 | Barr et al. |
| 6,234,163 B1 | 5/2001 | Garrod |
| 6,418,769 B1 | 7/2002 | Schreiner |
| 6,729,181 B2 | 5/2004 | Mayer et al. |
| 6,830,076 B1 | 12/2004 | Patel |
| 7,225,678 B2 | 6/2007 | Kandler et al. |
| 7,360,450 B2 | 4/2008 | Müller |

(Continued)

FOREIGN PATENT DOCUMENTS

DE      102008013224      9/2009

*Primary Examiner* — Justin N Olamit
(74) *Attorney, Agent, or Firm* — Tsircou Law, PC

(57) ABSTRACT

An ultrasonic sensor assembly is provided having sensor body having opposing open ends for enabling fluid flow therethrough. The body defines an interior measurement section therein. The body defines a plurality of spiral flow paths disposed about a longitudinal axis of the measurement section. The sensor assembly includes a pair of ultrasonic transceivers mounted to the tubular body in spaced longitudinal relationship across the measurement section. An electronics housing mounted to the body in a separable manner, when mounted, the electronics housing is in operable communication with the pair of ultrasonic transceivers to measure fluid parameters within the measurement section.

17 Claims, 6 Drawing Sheets

(56) References Cited

U.S. PATENT DOCUMENTS

| | | |
|---|---|---|
| 7,490,632 B2 | 2/2009 | Grebe |
| 7,954,387 B1 * | 6/2011 | Furlong .................... G01F 1/74 |
| | | 73/861.28 |
| 7,987,732 B2 | 8/2011 | Konzelmann et al. |
| 8,523,432 B2 | 9/2013 | Mujumdar et al. |
| 8,776,593 B2 | 7/2014 | Margalit et al. |
| 8,955,392 B2 * | 2/2015 | Liu .......................... G01F 1/66 |
| | | 73/861.28 |
| 9,188,259 B2 | 11/2015 | Fiolek et al. |
| 9,297,680 B2 | 3/2016 | Maruyama et al. |
| 9,422,953 B2 * | 8/2016 | Ehrlich .................... F15D 1/00 |
| 10,041,620 B2 | 8/2018 | Balmer et al. |
| 2010/0201984 A1 | 8/2010 | Schuda et al. |
| 2011/0088483 A1 | 4/2011 | Will et al. |
| 2013/0061686 A1 | 3/2013 | Fujii et al. |
| 2018/0283917 A1 | 10/2018 | Murakami et al. |

* cited by examiner

ULTRASONIC SENSOR ASSEMBLY AND METHOD OF MANUFACTURE

FIELD OF THE INVENTION

The present invention relates generally to sensors for measuring fluids, more particularly, to ultrasonic sensor assemblies.

BACKGROUND OF THE INVENTION

Ultrasonic sensor assemblies have been used to measure properties of fluids. Such sensors typically include ultrasonic transceivers in operative communication across a flow of fluid, which are electrically coupled to electronics that assess transmission (transit times, phase or frequency shifts) to determine parameters of the fluid, such as fluid flow, density, viscosity, temperature, among others.

Flow sensors of such kind typically comprise the transceivers disposed across a conduit as measurement section. They require a well-defined flow profile through the measurement section for accurate measurement to allow extrapolation of results from a limited sample of the cross-section.

Although current approaches are generally effective, shortfalls exist. For example, in current approaches, it is required to position the measurement section downstream along a long, straight flow section, so that the flow velocity profile is stable and known as it passes through the measurement section. As such, such sensors are not desirable or effective, in applications that lack a long, straight flow section. To that end, a flow conditioner device is oftentimes positioned proximate to the entry to the cylindrical measurement section. Such accessories can be relatively expensive and cumbersome to install.

It should therefore be appreciated that there remains a need for an ultrasonic sensor assembly that addresses these concerns. The present invention fulfills these needs and others.

SUMMARY OF THE INVENTION

Briefly, and in general terms, the invention provides an ultrasonic sensor assembly comprising a sensor body having opposing open ends for enabling fluid flow therethrough. The body defines an interior measurement section therein. The body defines a plurality of spiral flow paths disposed about a longitudinal axis of the measurement section. The sensor assembly includes a pair of ultrasonic transceivers mounted to the tubular body in spaced longitudinal relationship across the measurement section. An electronics housing can be mounted to the body in a separable manner, and when mounted, the electronics housing is in operable communication with the pair of ultrasonic transceivers to measure fluid parameters within the measurement section.

In an independent aspect of the invention, a method of manufacture is provided for an ultrasonic sensor assembly utilizing a mold for the sensor body having an outer shell and a mold core, configured to result in a sensor body having opposing open ends for enabling fluid flow therethrough, in which the body defines an interior measurement section therein.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
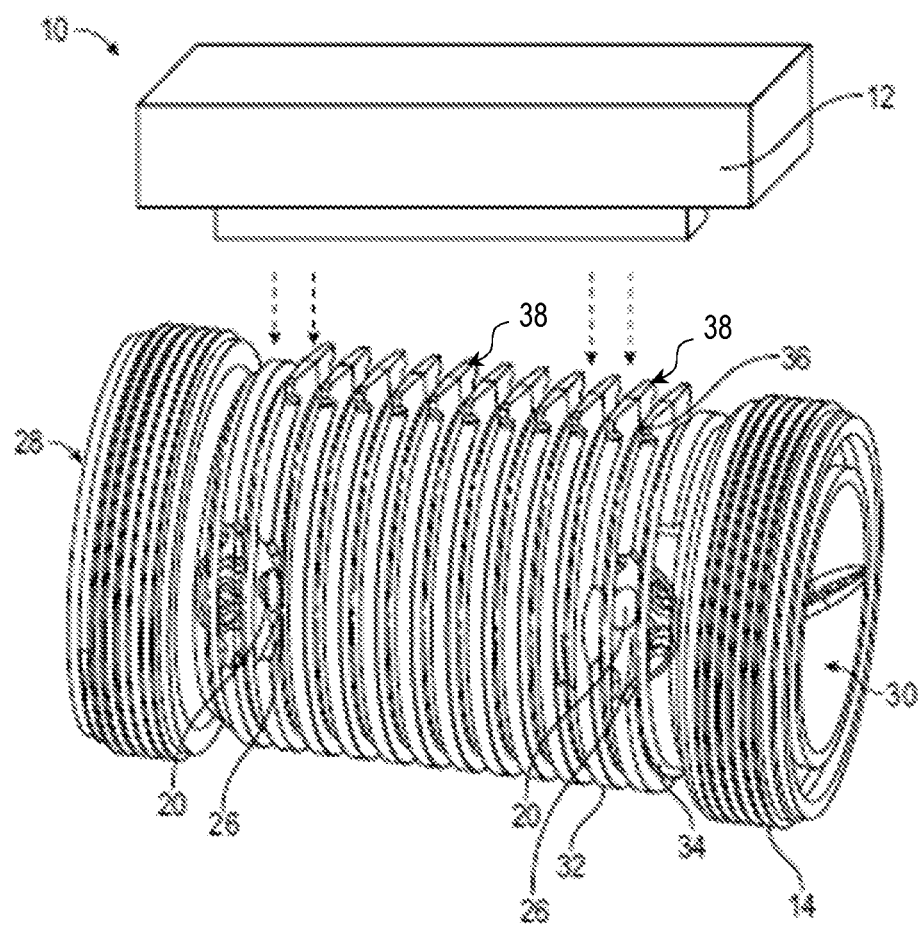
FIG. 1 is a partially exploded, perspective view of an ultrasonic sensor assembly in accordance with the present invention, depicting an electronics housing mounted atop a tubular body.
Figure 2:
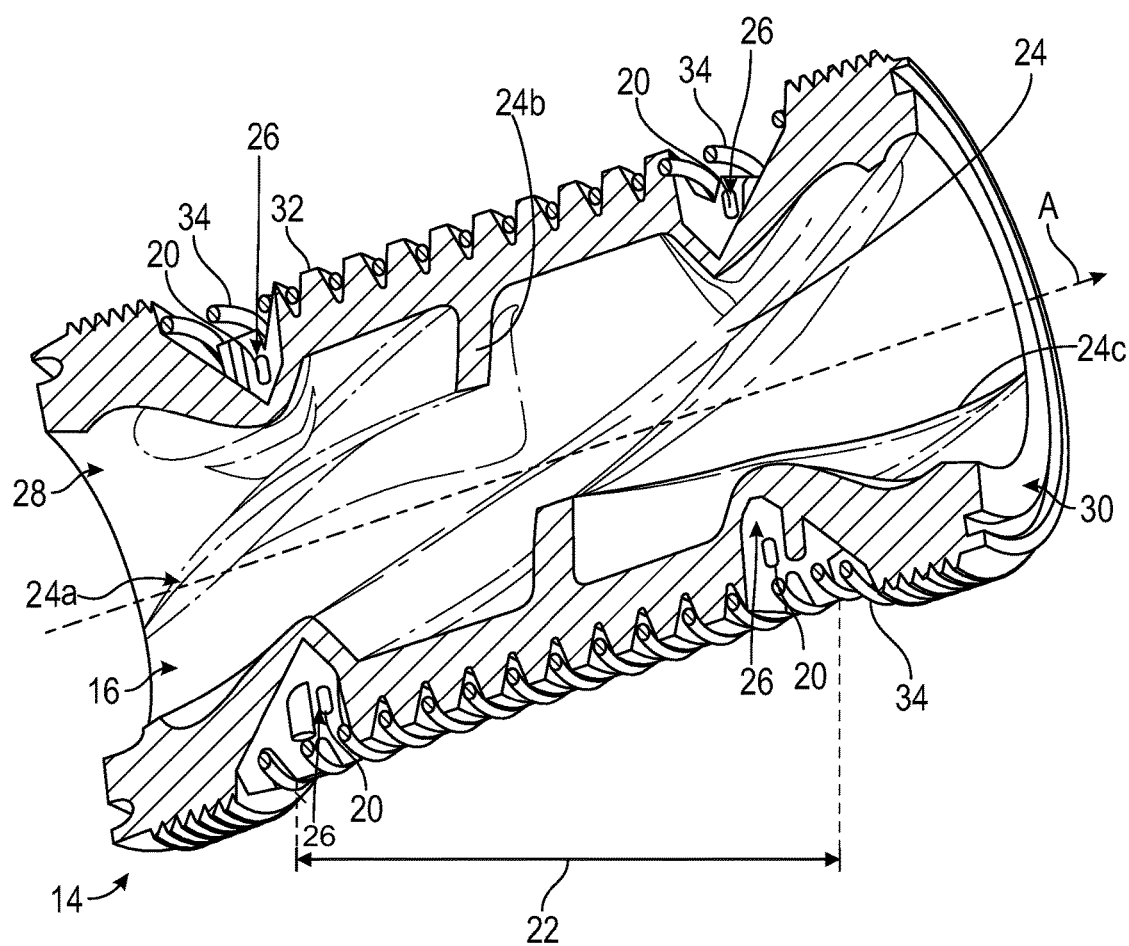
FIG. 2 is a cross sectional view of the tubular body of the ultrasonic sensor assembly of FIG. 1, depicting a plurality of curved vanes that extend through a measurement section.

Referring now to the drawings, and particularly FIGS. 1 and 2, there is shown an ultrasonic sensor assembly 10 having an electronics housing 12 mounted to a tubular sensor body 14, which defines a plurality of spiral flow paths 16 disposed about a longitudinal axis (A) of a measurement section 22. Ultrasonic transceivers 20 are mounted to the tubular body in spaced relationship across the measurement section 22. More particularly, the ultrasonic transceivers 20 are longitudinally spaced such that communication therebetween al least partially travels in correspondence with the direction of fluid flow through the measurement section.

In the exemplary embodiment, the spiral flow paths 16 are formed by curved interior walls 24 of the sensor body 14, curved vanes, extending through the measurement section 22. The interior wall initiates upstream from the measurement section and terminates downstream from the measurement section. The height profile of the interior walls include an upwardly sloping leading edge (24a), a maximum height region within the measurement section (24b), and a downwardly sloping trailing edge (24c). In the exemplary embodiment, the upwardly sloping leading edge initiates upstream from the measurement section, and the trailing edge terminates downstream from the measurements section. This configuration attributes to a desired flow within the measurement section, thereby aiding in accurate measurement.

The tubular body 14 includes four interior walls 24, curved vanes, having generally helical shape, twisting through the measurement section 22. The number and shape of the interior walls can vary in different embodiments without departing from the invention.

With continued reference to reference to FIG. 2, the sensor assembly 10 includes a plurality of ultrasonic transceivers 20 in spaced longitudinal relationship across the measurement section. In the exemplary embodiment, the ultrasonic transceivers operate in pairs, wherein a first transceiver is in a line communication with a second transceiver located downstream there from on opposing side relative to the longitudinal axis (A) of the sensor body 14.

In the exemplary embodiment, transceivers 20 are piezo-disks attached to sensor cavities 26 is formed by the tubular body 14. The transceivers are operatively coupled using wires to electronics (not shown) within the housing 12. The piezo disks can be made from piezoelectric material like lead zirconium titanate, quartz crystal or piezoelectric polymer.

The body 14 provides four sensor cavities 26 positioned such that the transceivers are directed towards the measurement section, and so that corresponding transceivers can have a clear line of communication through the measurement section, unimpeded by interior walls 24. The sensor cavities protrude into the interior tubular region of the body proximate to respective interior walls 24. In other embodiments, the sensor cavities can be recessed relative to the interior tubular region of the sensor body. Having the sensor cavity wall terminate or partially obstruct separate flow paths helps fluid exchange between the channels and thus better mixing and averaging of the flow, enhancing the measurement accuracy.

Figure 3:
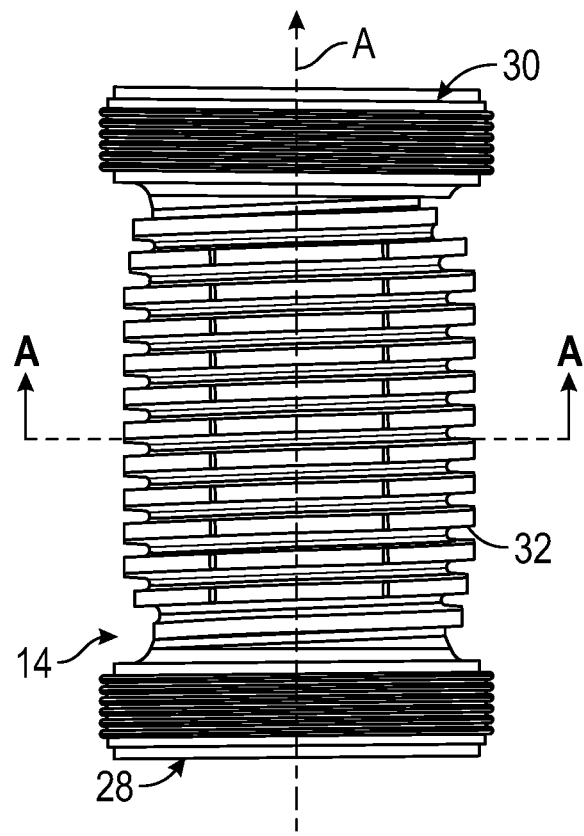
FIG. 3 is a top view of the tubular body of the ultrasonic sensor assembly of FIG. 1.
Figure 4:
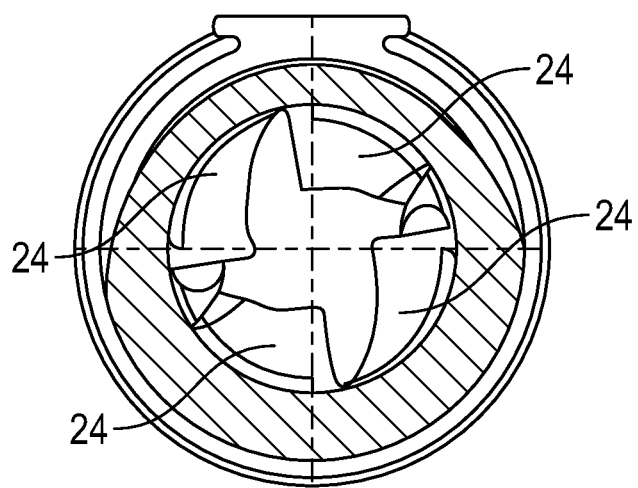
FIG. 4 is a cross sectional view, along line A-A, of the tubular body of FIG. 3.

With reference now to FIGS. 3 and 4, the sensor body included opposing ends 28, 30 configured to attach inline to a fluid flow system. The sensor body 14 is configured to maintain its form, to minimize radial and axial variation, despite variations in pressure or temperature, during use. The sensor body 14 is formed of a unity construction, having spiraling ridge(s) 32 projecting from its exterior wall. The spiraling ridge aids structural stability of the sensor body during use, predominantly in radial direction, aiding in measurement accuracy. Another reason for having a ridge or ridges instead of a thicker solid wall is the improvement in manufacturability by injection molding, reducing the process time. The spiraling ridge extends between the opposing ends, proximate thereto. Instead of a single spiraling ridge this reinforcement may be configured as a number of separate ring-shaped ridges as well.

With reference again to FIG. 1, the sensor body 14 provides mount 36 for securing the electronics housing 12 thereto. In this embodiment, The mount is formed by projections 38 of the spiral ridges. The sensor assembly 10 can further include a rigid structure 34 (FIG. 1) attached about the sensor body 14 to provide further structural stability, during use. In the exemplary embodiment, the rigid structure 34 is configured as a spring confined within the recess formed by the ridges 32. The spring can be metal. An alternative version of such reinforcement can be a wrap of resin-impregnated glass fiber or carbon fiber strands in the grooves between the ridges.

Figures 5, 6:
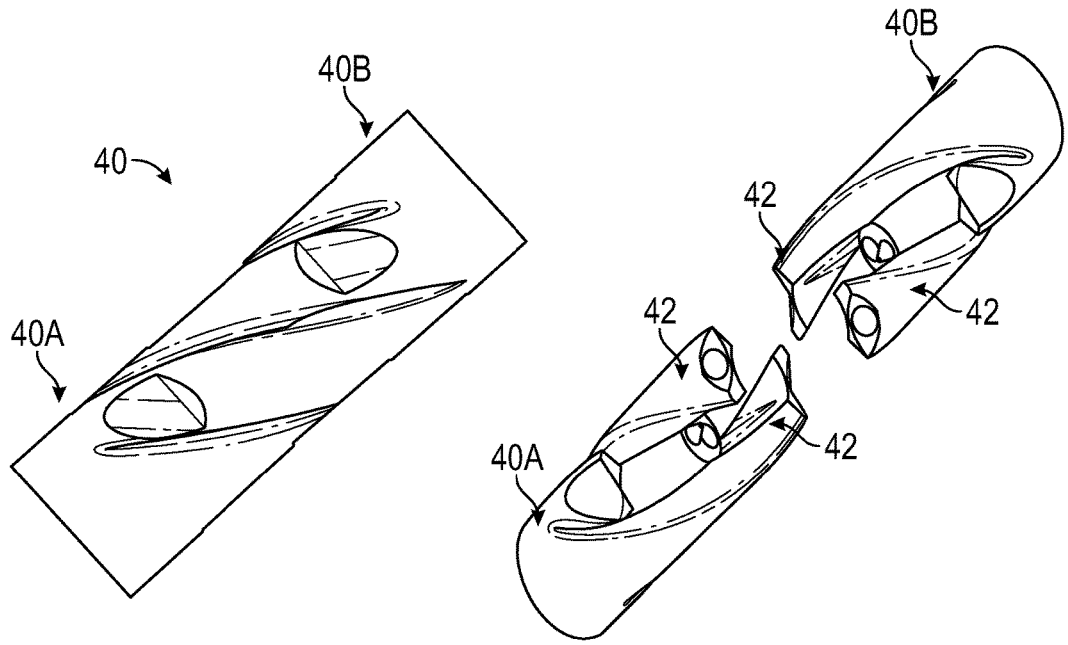
FIG. 5 is a perspective view of a mold core used in creating the tubular body of FIG. 3.
FIG. 6 is an exploded view of the mold core of FIG. 5.
Figure 7:
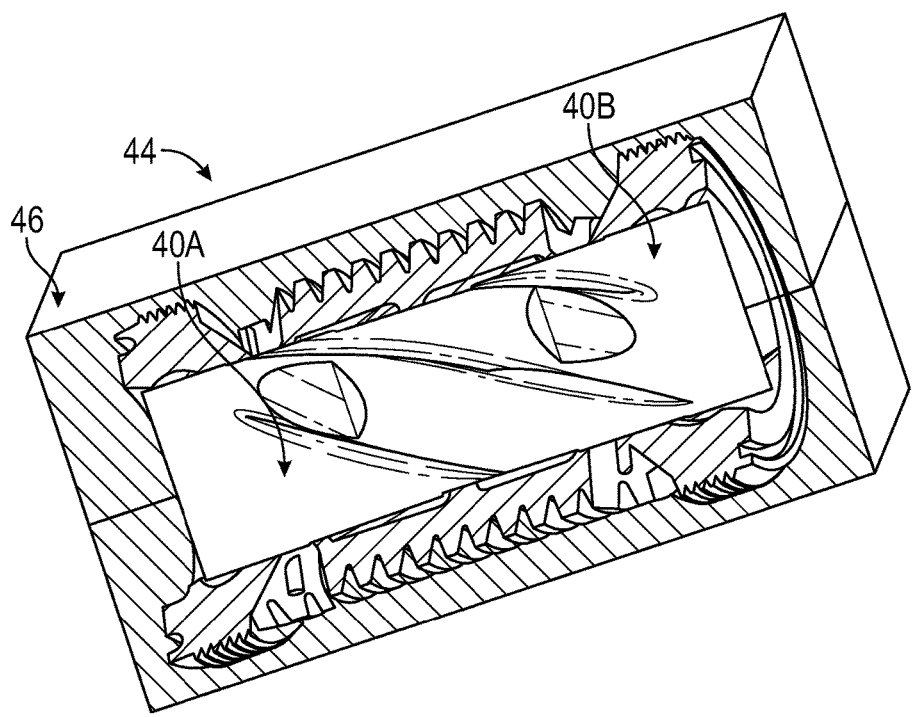
FIG. 7 is a cross-sectional view of the mold form (FIG. 5) and the tubular body (FIG. 3).

With reference now to FIGS. 5-8, the sensor body 14 is formed of thermoplastic material via injection molding utilizing a two-part mold core 40 (A, B), forming a sensor body 14 of unitary construction. The mold core enables the formation of the interior tubular section of the sensor body including the interior walls 24 and sensor cavities 26. As best seen in FIG. 6, each mold core part has a plurality of twisting projections 42 that terminate proximate to a corresponding wall of the resulting sensor cavity 26. The twisting projections of the opposing mold core parts fit in such a manner that the mold core parts that can be removed from the opposing ends 28, 30, of sensor body, once the body is formed.

Figure 8:
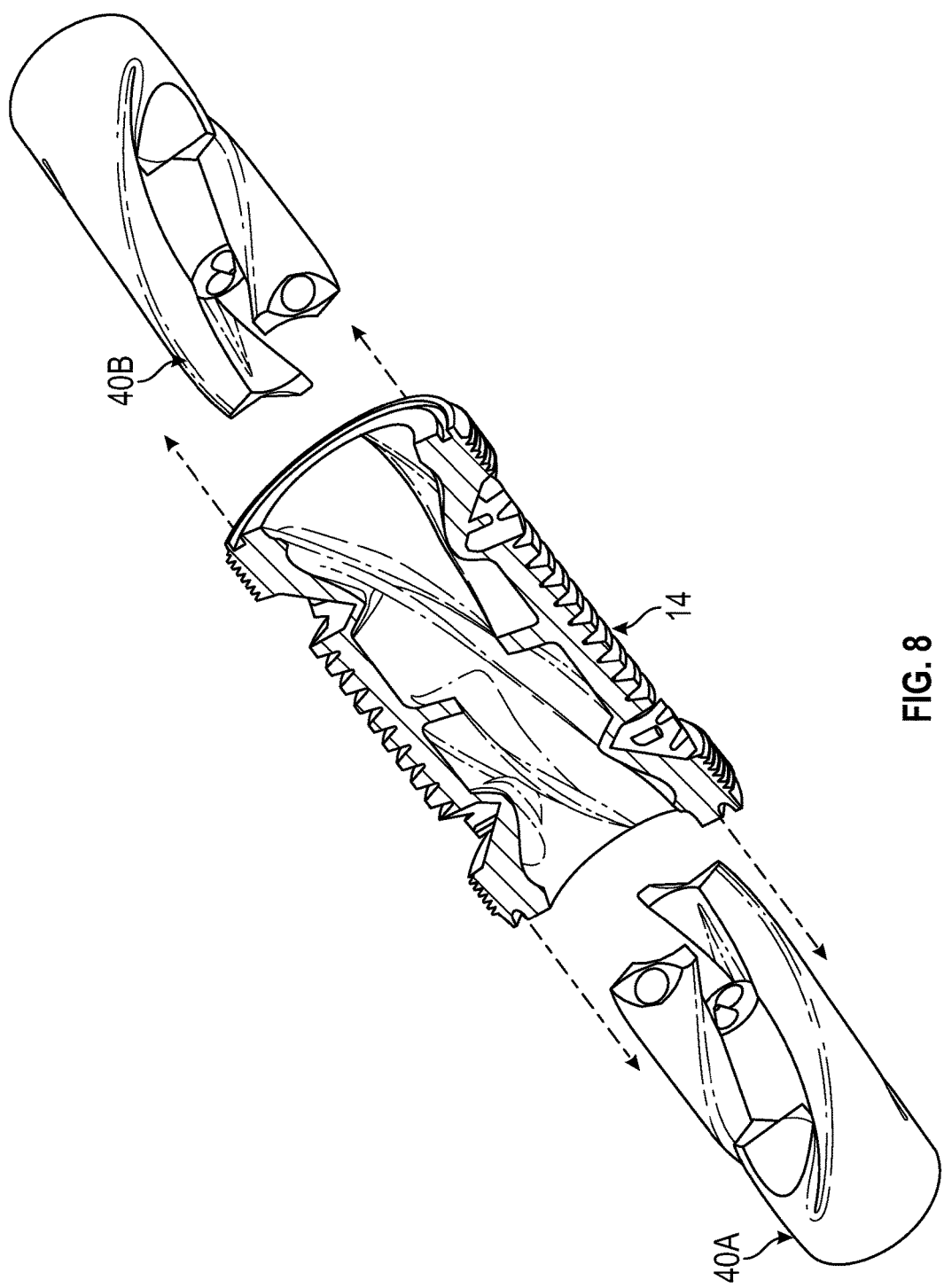
FIG. 8 is an exploded view of the mold core (FIG. 5) and the tubular body (FIG. 3).

In an exemplary method of manufacture, the mold 44 for the sensor body comprises an outer shell 46 and the mold core 40(A, B) positioned therein. The mold 44 is thereafter injected with a desired composition of thermoplastic material, preferably a commonly used piping system plastic like PVC, CPVD, PVDF, PP, PE or ABS. Other materials are feasible as well. As best seen in FIG. 8, once the material is sufficiently cooled, the mold core can be removed by extracting each of the mold core portions and a twisting manner out of the opposing end openings of the resulting sensor body.

Once the sensor body 14 is formed, the ultrasonic transceivers 20 are mounted within the corresponding sensor cavities 26 using an appropriate adhesive for the chosen plastic like Epoxy or Polyurethane resin. Wires connecting the transceivers (piezo disks) to the control electronics are soldered to the metallization of the piezo disks and then routed through the grooves of the spiral ridges 32 up to the electronics housing 12. The electronics housing 12 is disposed about the sensor body within recesses formed by the and locked with a snap feature.

Figure 9:
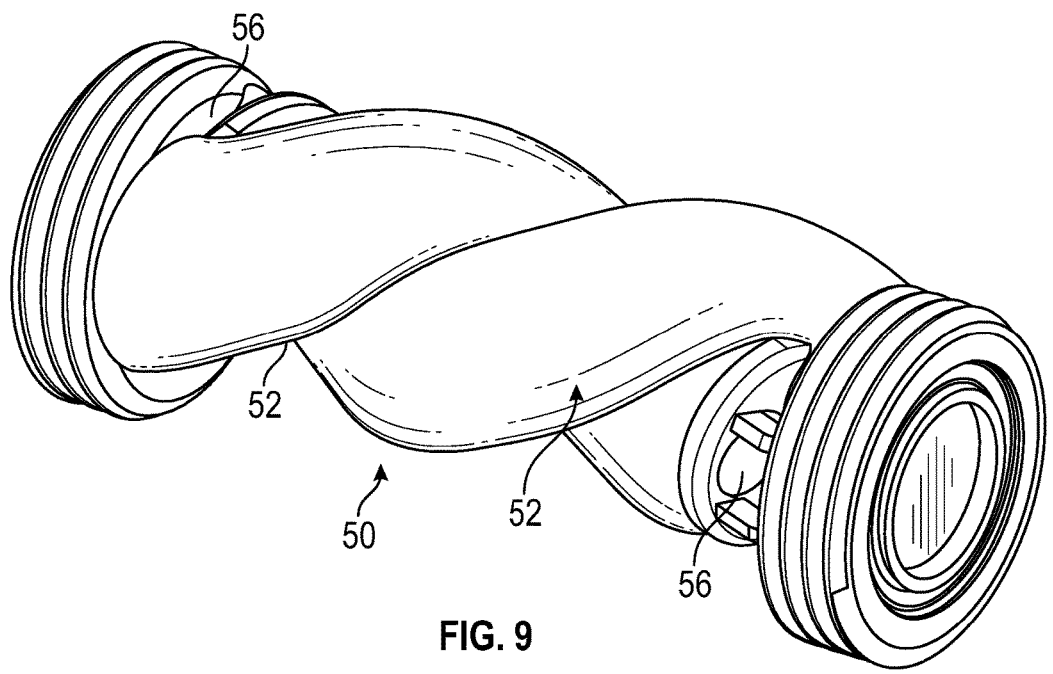
FIG. 9 is perspective view of second embodiment of an ultrasonic sensor assembly in accordance with the present invention.
Figure 10:
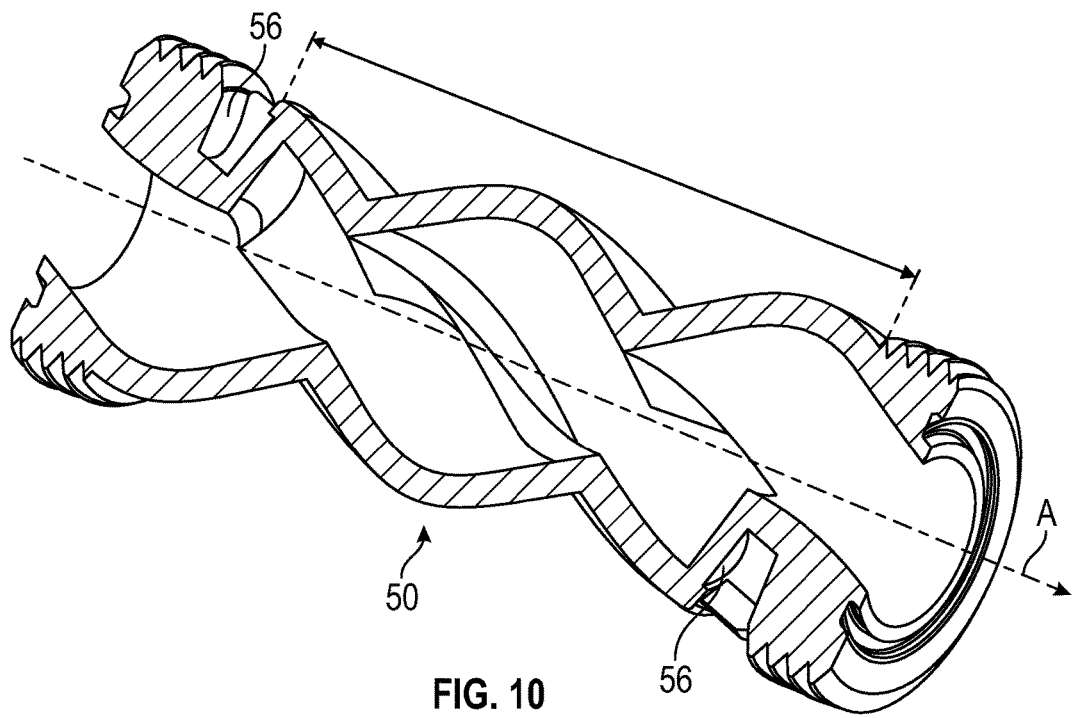
FIG. 10 is a cross sectional view of the ultrasonic sensor assembly of FIG. 9.

After attaching the piezo disks, the sensor cavity is filled with epoxy resin or similar potting material. The reinforcing metal spring or fiber wrap (i.e., rigid structure 34) would be applied at this time With reference now to FIGS. 9 and 10, a sensor body 50 is shown for use in a sensor assembly in accordance with the invention. The sensor body 50 defines a plurality of spiral flow paths 52 disposed about a longitudinal axis (A) of a measurement section 54. Ultrasonic transceivers 56 are mounted to the tubular body 50 in spaced relationship across the measurement section 54. More particularly, the ultrasonic transceivers 56 are longitudinally spaced such that communication therebetween al least partially travels in correspondence with the direction of fluid flow through the measurement section. In this embodiment, the body defines a two twisted paths, visible from exterior thereof.

It should be appreciated from the foregoing that the present invention provides an ultrasonic sensor assembly comprising a sensor body having opposing open ends for enabling fluid flow therethrough. The body defines an interior measurement section therein. The body defines a plurality of spiral flow paths disposed about a longitudinal axis of the measurement section. The sensor assembly includes a pair of ultrasonic transceivers mounted to the tubular body in spaced longitudinal relationship across the measurement section. An electronics housing mounted to the body in a separable manner, when mounted, the electronics housing is in operable communication with the pair of ultrasonic transceivers to measure fluid parameters within the measurement section.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. An ultrasonic sensor assembly, comprising:
   a sensor body having opposing open ends for enabling fluid flow therethrough, the body defining an interior measurement section therein disposed about a longitudinal axis, the body including a plurality of curved interior walls that spiral about the longitudinal axis within the measurement section, so as to attain a desired fluid flow therein, the plurality of curved interior walls each having:
      an upwardly sloped leading edge initiating upstream of the measurement section,
      a downwardly sloped trailing edge terminating downstream of the measurement section, and
      a maximum height region within the measurement section disposed between the leading edge and trailing edge;
   one or more pairs of ultrasonic transceivers mounted to the body in spaced longitudinal relationship across the measurement section; and
   an electronics housing mounted to the body, the electronics housing in operable communication with the one or more pairs of ultrasonic transceivers to measure fluid parameters within the measurement section.

2. The ultrasonic sensor assembly as defined in claim 1, wherein the electronics housing is mounted to the body in a separable manner, when mounted, the electronics housing in operable communication with the one or more pairs of ultrasonic transceivers to measure fluid parameters within the measurement section.

3. The ultrasonic sensor assembly as defined in claim 1, wherein the sensor body is formed of unitary construction.

4. The ultrasonic sensor assembly as defined in claim 1, wherein a plurality of spiral flow paths is formed by the plurality of interior walls.

5. The ultrasonic sensor assembly as defined in claim 1, wherein the body defines one or more pairs of sensor cavities, each sensor cavity positioned proximate to a corresponding opposing open end of the body, each ultrasonic transceiver of the one or more pairs of ultrasonic transceivers disposed in a respective sensor cavity of the one or more pairs of sensor cavities.

6. The ultrasonic sensor assembly as defined in claim 1, wherein the sensor body includes a spiraling ridge projecting from an exterior wall of the body.

7. The ultrasonic sensor assembly as defined in claim 1, wherein the sensor body includes a plurality of spiraling ridges projecting from an exterior wall of the body, the plurality of spiraling ridges arranged adjacent to each other.

8. The ultrasonic sensor assembly as defined in claim 7, further comprising one or more rigid structures, wherein each rigid structure is disposed between a pair of adjacent spiraling ridges of the plurality of spiraling ridges.

9. An ultrasonic sensor assembly, comprising:
   a sensor body having a unitary construction, having opposing open ends for enabling fluid flow therethrough, the body defining an interior measurement section therein disposed about a longitudinal axis, the body including a plurality of curved interior walls that spiral about the longitudinal axis within the measurement section, so as to attain a desired fluid flow therein, the plurality of curved interior walls each having:
      an upwardly sloped leading edge initiating upstream of the measurement section,
      a downwardly sloped trailing edge terminating downstream of the measurement section, and
      a maximum height region within the measurement section disposed between the leading edge and trailing edge;
   one or more pairs of ultrasonic transceivers mounted to the body in spaced longitudinal relationship across the measurement section; and
   an electronics housing mounted to the body in a separable manner, when mounted, the electronics housing in operable communication with the one or more pairs of ultrasonic transceivers to measure fluid parameters within the measurement section.

10. The ultrasonic sensor assembly as defined in claim 9, wherein the body defines one or more pairs of sensor cavities, each sensor cavity positioned proximate to a corresponding opposing open end of the body, each ultrasonic transceiver of the one or more pairs of ultrasonic transceivers disposed in a respective sensor cavity of the one or more pairs of sensor cavities.

11. The ultrasonic sensor assembly as defined in claim 9, wherein a plurality of spiral flow paths is formed by the plurality of interior walls.

12. An ultrasonic sensor assembly, comprising:
   a sensor body having opposing open ends for enabling fluid flow therethrough, the body defining an interior measurement section therein disposed about a longitudinal axis, the body defining a plurality of spiral flow paths disposed about said longitudinal axis within the measurement section, so as to attain a desired fluid flow therein;
   one or more pairs of ultrasonic transceivers mounted to the body in spaced longitudinal relationship across the measurement section; and
   an electronics housing mounted to the body, the electronics housing in operable communication with the one or more pairs of ultrasonic transceivers to measure fluid parameters within the measurement section;
   a plurality of spiraling ridges projecting from an exterior wall of the body, the plurality of spiraling ridges arranged adjacent to each other; and
   one or more rigid structures, wherein each rigid structure is disposed between a pair of adjacent spiraling ridges of the plurality of spiraling ridges.

13. The ultrasonic sensor assembly as defined in claim 12, wherein the electronics housing is mounted to the body in a separable manner, when mounted, the electronics housing in operable communication with the one or more pairs of ultrasonic transceivers to measure fluid parameters within the measurement section.

14. The ultrasonic sensor assembly as defined in claim 12, wherein the sensor body is formed of unitary construction.

15. The ultrasonic sensor assembly as defined in claim 12, wherein the plurality of spiral flow paths are formed by a plurality of curved vanes.

16. The ultrasonic sensor assembly as defined in claim 15, wherein each of the plurality of curved vanes includes an upward sloping leading edge and downward sloping trailing edge relative to a longitudinal direction of flow through the measurement section.

17. The ultrasonic sensor assembly as defined in claim 12, wherein the body defines one or more pairs of sensor cavities, each sensor cavity positioned proximate to a corresponding opposing open end of the body, each ultrasonic transceiver of the one or more pairs of ultrasonic transceivers disposed in a respective sensor cavity of the one or more pairs of sensor cavities.

* * * * *